(12) United States Patent
Skotch et al.

(10) Patent No.: US 6,362,772 B1
(45) Date of Patent: Mar. 26, 2002

(54) TRANSPONDER PLOT SYSTEM AND METHOD

(75) Inventors: Derwin P. Skotch, Pleasant Mount; David H. McDowell, Honesdale, both of PA (US)

(73) Assignee: Loral SpaceCom Corporation, New York, NY (US)

( * ) Notice: Subject to any disclaimer, the term of this patent is extended or adjusted under 35 U.S.C. 154(b) by 0 days.

(21) Appl. No.: 09/580,046

(22) Filed: May 27, 2000

(51) Int. Cl.[7] .............................................. G01S 13/74
(52) U.S. Cl. ........................ 342/42; 342/50; 342/175; 342/192; 342/195; 342/352; 342/353; 342/450; 342/451; 340/988; 340/989; 340/990; 340/993; 340/995; 340/501; 340/505
(58) Field of Search ..................... 342/42–52, 450–565, 342/175, 192, 193–197, 29–32, 36, 37, 38, 39, 40, 41, 385, 417, 442, 352–358; 340/988–995, 501, 505

(56) References Cited

U.S. PATENT DOCUMENTS

| | | | | |
|---|---|---|---|---|
| 3,739,378 A | * | 6/1973 | Botzum et al. | 342/50 |
| 3,772,692 A | * | 11/1973 | Braddon | 342/41 |
| 5,227,803 A | * | 7/1993 | O'Connor et al. | 342/442 |

* cited by examiner

Primary Examiner—Bernarr E. Gregory
(74) Attorney, Agent, or Firm—Kenneth W. Float

(57) ABSTRACT

A system and method for providing remote viewing of satellite transponder plots. The system and method piovides for remote viewing of transponder plots derived from transponders located on a satellite that communicate with ground terminals having an antenna. The system comprises an antenna switch for receiving transponder signals from the antenna. A spectrum analyzer is coupled to the antenna switch for generating transponder plots. An equipment control computer is coupled to the antenna switch and the spectrum analyzer that selectively routes signals from the antenna switch to the spectrum analyzer and routes transponder plots generated by the spectrum analyzer. A server computer is coupled to the equipment control computer that stores the transponder plots generated by the spectrum analyzer that are routed by the equipment control computer. One or more remotely located client computers are coupled to the server computer that each comprise a software program for remotely viewing the transponder plots stored on the server computer. In a exemplary method, transponder plots derived from data received by the antennas are selectively generated. The transponder plots are stored on the server computer. The transponder plots stored on the server computer are remotely viewed from one or more remotely located client computers using the computer program.

9 Claims, 2 Drawing Sheets

TRANSPONDER PLOT SYSTEM AND METHOD

BACKGROUND

The present invention relates generally to transponders that are used on satellites, and more particularly, to a system and method generating and remotely viewing satellite transponder plots.

The assignee of the present invention manufactures and deploys communication satellites for providing global communication services. Each of the communication satellites include a plurality of transponders that provide communication channels between Earth terminals and/or ground stations. Satellite transponder plots are typically generated each day that allow engineers to analyze and troubleshoot potential problems with the transponders.

Heretofore, engineers employed by the assignee of the present invention would call an operations center to have a transponder plot taken on paper, and then this was sent to the physical location of the engineers via a fax machine. Also, full bandwidth paper plots (550 MHz spans) were taken 3 times a day and were kept in a filing cabinet. The paper plots could also be sent via fax machine to the physical location of the engineers if desired.

It is an objective of the present invention to provide for an improved system and method for generating and remotely viewing satellite transponder plots. It is an objective of the present invention to provide for an improved system and method that allows analysis of transponder data to look for trends and troubleshoot problems, and archive long term history of communication traffic on satellites.

SUMMARY OF THE INVENTION

To accomplish the above and other objectives, the present invention is a system and method for providing remote viewing of satellite transponder plots. The system and method also permits analysis of transponder data to look for trends and troubleshoot problems. The system and method also archives files indicative of the long term history of communication traffic on satellites.

The system provides for remote viewing of satellite transponder plots derived from transponders located on a satellite that communicate with ground terminals having an antenna. The system comprises an antenna switch for receiving transponder signals from the antenna. A spectrum analyzer is coupled to the antenna switch for generating transponder plots. An equipment control computer is coupled to the antenna switch and the spectrum analyzer that selectively routes signals from the antenna switch to the spectrum analyzer and routes transponder plots generated by the spectrum analyzer. A server computer is coupled to the equipment control computer that stores the transponder plots generated by the spectrum analyzer that are routed by the equipment control computer. One or more remotely located client computers are coupled to the server computer that each comprise a software program for remotely viewing the transponder plots stored on the server computer.

The method provides for remote viewing of satellite transponder plots derived from transponders located on a satellite that communicate with ground terminals that each have an antenna. In implementing the method, transponder plots derived from data received by the antennas are selectively generated. The transponder plots are stored on a server computer. The transponder plots stored on the server computer are remotely viewed from one or more remotely located client computers using a computer program.

In a reduced-to-practice embodiment, the present invention provides for a system and method wherein data relating to transponders disposed on Loral Skynet satellites deployed by the assignee of the present invention, for example, are plotted automatically as often as desired within equipment constraints, and the transponder plots are stored as files on a server computer. The stored transponder files are remotely viewable from client computers coupled to the server computer.

The transponder files may be viewed whenever it is necessary either using a Microsoft Excel program and a macro, or using a dedicated plot viewer. The system and method not limited however to use with specific satellites and is of great value to the industry in general. Personnel, such as engineers, for example, desiring access to high quality transponder plots at all times may be accessed from a computer having a modem and the requisite software.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
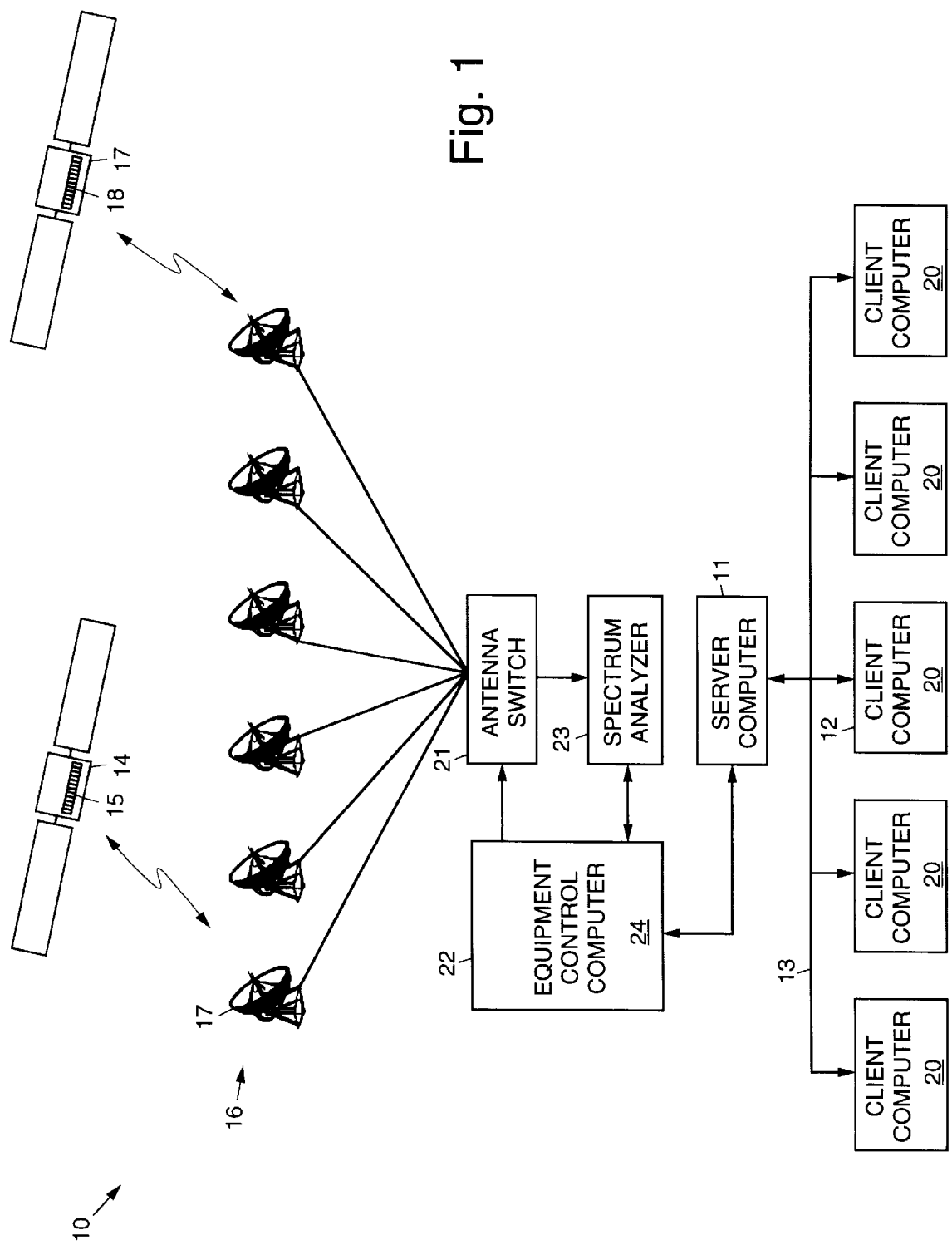
FIG. 1 illustrates an exemplary embodiment of a system in accordance with the principles of the present invention for providing remote viewing of satellite transponder plots.

Referring to the drawing figures, FIG. 1 illustrates an exemplary embodiment of a system 10 in accordance with the principles of the present invention for providing remote viewing of satellite transponder plots. The system 10 comprises a server computer 11 that is coupled to a plurality of client computers 12 by way of a network, 13 or communication link 13, for example. The client computers 12 each comprise a software program 20 that provides for remote viewing of satellite transponder plots, analysis of data to look for trends and troubleshoot problems, and generates a long term history of communication traffic on satellites 14.

A plurality of satellites 14 each having a plurality of transponders 15 orbit the Earth in either geosynchronous or low Earth orbits. The transponders 15 are used to communicate between a plurality of ground terminals 16 having one or more antennas 17. An antenna switch 21 is coupled to each of the antennas 17. And is used to selectively couple signals received thereby.

An equipment control computer 22 is coupled to the antenna switch 21 and comprises a computer program 24 that is used to control signals routed by the antenna switch 21. A spectrum analyzer 23 is coupled to the antenna switch 21 and the equipment control computer 22. The antenna switch 21 is controlled by the equipment control computer 22 to selectively route signals from the respective antennas 17 to the spectrum analyzer 23.

The output of the spectrum analyzer 23 is processed by the equipment control computer 22 and output to the server computer 11 which stores the transponder files. The transponder files are routed from the server computer 11 to the remotely located client computers 12 under control of the software program 20 running on the client computers 12.

The equipment control computer 22 processes data generated by the spectrum analyzer 23 to generate the satellite transponder plots. The satellite transponder plots are then viewed at the remotely located client computers 12 using the software program 20.

In operation, microwave signals from the antennas 17 are selectively fed to the spectrum analyzer 23 by way of the antenna switch 21 that is controlled by the computer program 24 running on the equipment control computer 22. The computer program 24 running on the equipment control computer 22 automatically switches the antenna switch 21 and the settings of the spectrum analyzer 23 to sequentially generate spectral plots of the transponders 15 on the satellites 14 and saves them as files on the server computer 11. The files are time stamped and saved in a directory that is structured by date, time, and satellite 14. Users, such as engineers and technicians, for example, can view these plots at any time over the network 13 from the client computers 12. Currently, these plots are generated three times a day, but may be done as often as desired within equipment constraints.

More particularly, the computer program 24 running on the equipment control computer 22 reads a configuration file that specifies parameters that are sent to the spectrum analyzer 23 and the antenna switch 21. The computer program 24 running on the equipment control computer 22 also reads data from a calibration file (generated by a preexisting system) that puts a calibrated reference line on the display screen of the spectrum analyzer 23. The equipment control computer 22 sends an instrument preset command to the spectrum analyzer 23.

The equipment control computer 22 sends commands to the antenna switch 21 to select the satellite 14, frequency band, and antenna polarization. Before the first transponder 15 on a given satellite 14, frequency band, and antenna polarization are plotted, a satellite beacon is measured. This measurement is used to set the reference level for the plots.

The computer program 24 running on the equipment control computer 22 sends commands to the spectrum analyzer 23 to set up the frequency, span, resolution bandwidth, video bandwidth, reference level, attenuator, and a calibrated reference line if calibration data is available for this transponder. The computer program 24 running on the equipment control computer 22 commands the spectrum analyzer 23 to take one sweep. The computer program 24 running on the equipment control computer 22 queries the spectrum analyzer 23 for frequency, span, resolution bandwidth, video bandwidth, sweep time, reference level, display line, scale (in dB per division), marker data, detector mode, measure uncal data, and power measurement data.

These data are generally well-understood by those skilled in using the spectrum analyzer 23. The phrase "measure uncal" is an indication by the spectrum analyzer 23 that it is not in a state where an accurate measurement can be made. This typically occurs when the sweep time is set too low for the bandwidth settings. The computer program 24 queries the analyzer 23 for a status byte, one bit of which is the "measure uncal" status.

The computer program 24 running on the equipment control computer 22 queries the spectrum analyzer 23 for the analyzer trace data. This data is read from the spectrum analyzer 23 as 601 points of data in a scale of 0 to 610, with 0 being a level that corresponds to the bottom graticule on the analyzer screen and 610 being a level slightly higher than the top graticule. This data is converted to dBm by the software as determined by the reference level of the spectrum analyzer 23 and the analyzer scale in decibels per division.

The computer program 24 running on the equipment control computer 22 then saves this data as a file in a temporary directory in a comma separated variable (.csv) format and with the filename generated by the satellite 14, frequency band, transponder number, date, time, and an identifier that specifies the console position where the plot was taken. For example, "T4K02_2000-04-13_12-00-00_conso13.csv" would be the filename generated for a plot of Telstar 4 transponder K2 on Apr. 13, 2000 at 12:00:00 by console position 3. The computer program 24 running on the equipment control computer 22 repeats steps 3 through 9 until all of the transponders 15, 550 MHz spans, and spacecraft beacons specified in the configuration file are plotted.

Console technicians can also take plots of specific carriers, interference, and the like, manually by simply clicking on an icon. This captures the data from the spectrum analyzer 23 as has been set up by the technician and/or the computer, including a second trace if it has been activated (typically used for maximum hold and/or minimum hold). In the case where the spectrum analyzer 23 has been set for maximum hold and/or minimum hold, the hold start time and date is also recorded.

Power measurement data is saved along with the plot if the technician has performed a power measurement, and marker data from the spectrum analyzer 23 is saved if the technician has the marker(s) activated on the spectrum analyzer. These plots taken manually by the technicians are filed on the server computer 11 by the technician in a directory separate from the automatic plots, but can also be viewed by anyone via the local area network 13.

Once the above-described process performed by the equipment control computer 22 has completed, the process implemented on the server computer 11 is started. A directory structure is created on the server computer 11 as determined by the date and time. For example, "P:\Daily_Plots\2000\04(Apr)\13\12.00" would be used to file lots generated on Apr. 13, 2000 at 12:00 noon.

The files are transferred from the equipment control computer 22 to this newly created directory and the read only attribute is set. Selected files (as determined by a configuration file which is currently 550 MHz spans) are copied, converted to .gif files and uploaded to server computer 11, and in particular may be uploaded to the Loral Skynet home page on the World Wide Web (located at www.loralskynet.com) as a service to customers.

Figure 2:
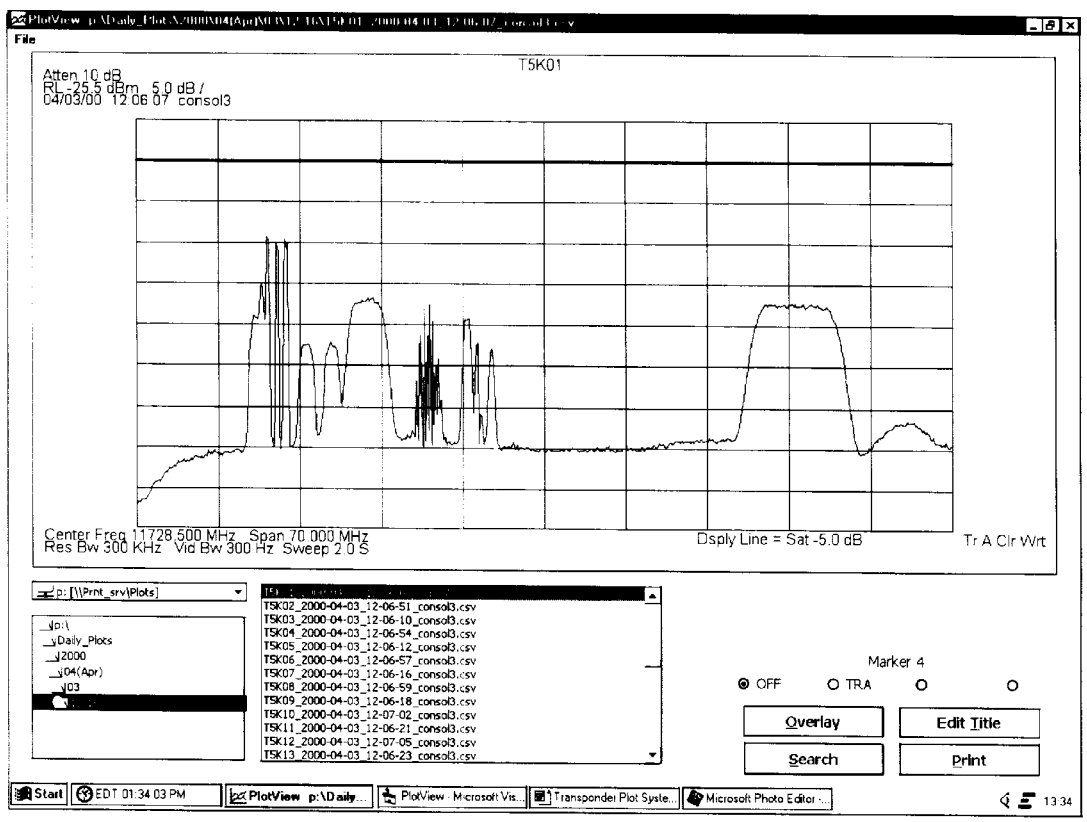
FIG. 2 shows an exemplary screen display produced by software used in the system shown in FIG. 1.

At the client computer 12, the user selects the file to be viewed using the drive, directory, and file list boxes (shown in FIG. 2). The program 20 reads the data from the file and uses it to recreate the spectrum analyzer screen on the display screen of the client computer 12 along with additional pertinent data. The user can further analyze the data by means of a marker that can be moved along the trace and measure amplitude and frequency, and also by overlaying a trace from another plot of the same frequency and span onto the same screen and comparing them.

Thus, the system 10 provides a means whereby every transponder 18 on Loral Skynet satellites 14, for example, is plotted automatically as often as desired within equipment constraints (currently 247 plots are taken in approximately 10 minutes, 3 times each day) and the resulting transponder files are stored as files on the server computer 11. These files can then be viewed by anyone having access to the server computer 11 whenever necessary either using a Microsoft Excel program, or other similar spreadsheet program, along with a macro, or a dedicated plot viewer such as PlotView developed by the assignee of the present invention, for example. The system 10 has been invaluable to Loral Skynet engineers, but is not limited however to use with Loral Skynet satellites 14, and is of great value in the industry.

FIG. 2 shows an exemplary screen display produced by the software program 20 used in the system shown in FIG. 1. More specifically, FIG. 2 illustrates a screen display produced by the computer program 20 and which is used to view the plots and specifically shows an RF spectrum of Telstar 5 Transponder Ku 1 on Apr. 3, 2000 at 12:06 PM. With this data, technicians and engineers can troubleshoot problems, check for trends, see whether a customer's signal is on the air, and so forth. A complete history of the traffic on a satellite 14 may be archived for future reference.

Figure 3:
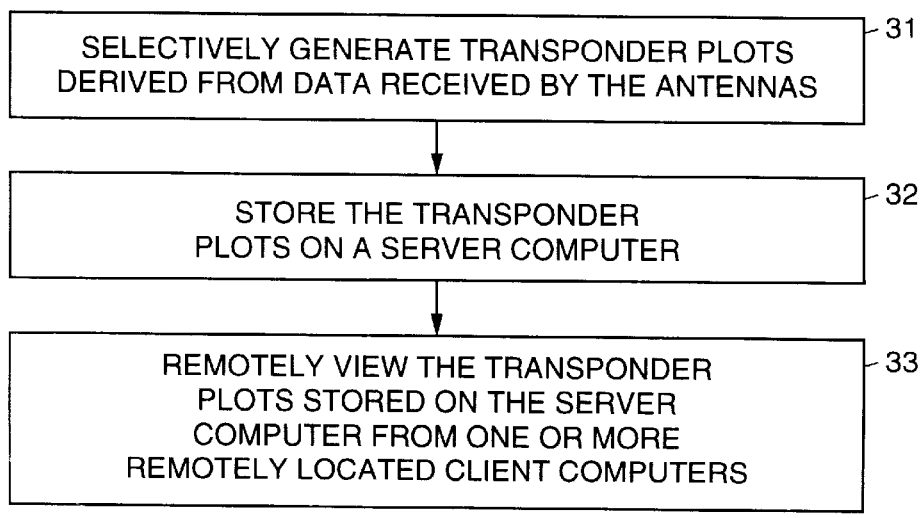
FIG. 3 illustrates an exemplary method in accordance with the principles of the present invention.

FIG. 3 illustrates an exemplary method 30 in accordance with the principles of the present invention. The method 30 provides for remote viewing of satellite transponder plots derived from transponders 15 located on a satellite 14 that communicate with ground terminals 16 that each have an antenna 17. The exemplary method 30 comprises the following steps.

Transponder plots derived from data received by the antennas 17 are selectively generated 31. The transponder plots are stored 32 on a server computer 11. The transponder plots stored on the server computer are remotely viewed 33 from one or more remotely located client computers 12 using a computer program 20.

Thus, an improved system and method for remote viewing satellite transponder plots have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A system that provides for remote viewing of satellite transponder plots derived from transponders located on a satellite that communicate with ground terminals that each have an antenna, comprising:

an antenna switch for receiving transponder signals from the antenna;

a spectrum analyzer coupled to the antenna switch for generating transponder plots;

an equipment control computer coupled to the antenna switch and the spectrum analyzer for selectively routing signals from the antenna switch to the spectrum analyzer and for routing transponder plots generated by the spectrum analyzer;

a server computer coupled to the equipment control computer that stores the transponder plots generated by the spectrum analyzer and routed by the equipment control computer;

one or more remotely located client computers coupled to the server computer that comprise a software program for remotely viewing the transponder plots stored on the server computer.

2. The system recited in claim 1 wherein the client computers are coupled to the server computer by a communication link.

3. The system recited in claim 1 wherein the client computers are coupled to the server computer by a network.

4. The system recited in claim 1 wherein the software program comprises a spreadsheet program, and a macro or a dedicated plot viewer.

5. The system recited in claim 1 wherein the software program comprises a dedicated plot viewer.

6. A method for remotely viewing satellite transponder plots derived from transponders located on a satellite that communicate with ground terminals that each have an antenna, comprising:

selectively generating transponder plots derived from data received by the antennas;

storing the transponder plots on a server computer; and remotely viewing the transponder plots stored on the server computer from one or more remotely located client computers.

7. The method recited in claim 6 wherein the transponder plots are remotely viewable using a software program disposed on the one or more remotely located client computers.

8. The method recited in claim 7 wherein the software program comprises a spreadsheet program and a macro or a dedicated plot viewer.

9. The method recited in claim 7 wherein the software program comprises a dedicated plot viewer.

* * * * *